United States Patent [19]

Gerteis

[11] Patent Number: 4,707,256

[45] Date of Patent: Nov. 17, 1987

[54] FILTER FOR SQUEEZING OUT SUSPENSIONS

[75] Inventor: Hans Gerteis, Bietigheim-Bissingen, Fed. Rep. of Germany

[73] Assignee: Heinkel Industriezentrifugen GmbH & Co., Bietigheim-Bissingen, Fed. Rep. of Germany

[21] Appl. No.: 853,024

[22] Filed: Apr. 17, 1986

[30] Foreign Application Priority Data

May 11, 1985 [DE] Fed. Rep. of Germany ....... 3517032

[51] Int. Cl.⁴ ...................... B01D 29/10; B01D 29/38
[52] U.S. Cl. ..................................... 210/236; 100/211; 210/391; 210/399; 210/408; 210/457
[58] Field of Search ................ 100/211, 198; 210/232, 210/236, 391, 398, 399, 402, 407, 408, 457

[56] References Cited

U.S. PATENT DOCUMENTS

| | | | |
|---|---|---|---|
| 3,712,209 | 1/1973 | Gwilliam | 100/211 X |
| 3,713,382 | 1/1973 | Gwilliam | 210/350 X |
| 3,753,498 | 8/1973 | Gwilliam | 210/350 |
| 3,753,499 | 8/1973 | Gwilliam | 210/350 |
| 3,762,560 | 10/1973 | Gwilliam | 210/350 |

FOREIGN PATENT DOCUMENTS

| | | | |
|---|---|---|---|
| 244142 | 12/1962 | Australia | 100/211 |
| 2549040 | 8/1979 | Fed. Rep. of Germany . | |

Primary Examiner—Richard V. Fisher
Assistant Examiner—W. Gary Jones
Attorney, Agent, or Firm—Shenier & O'Connor

[57] ABSTRACT

A filter for squeezing or pressing out suspensions has the following main components: a boiler-shaped outer casing, a cover releasably closing the outer casing at its open end face, a tubular filter element projecting from the cover and an elastic membrane which is arranged between outer casing and filter element and is connected, on the one hand, to the open end face of the outer casing and, on the other, to the end face of the filter element remote from the cover such that the membrane is inverted when the cover is removed coaxially from the outer casing. In a filter of this type, the inner diameter of the slack membrane in the region of the filter element is equal to or smaller than the outer diameter of the filter element.

9 Claims, 5 Drawing Figures

FILTER FOR SQUEEZING OUT SUSPENSIONS

The invention relates to a filter for squeezing or pressing out suspensions comprising a boiler-shaped outer casing, a cover releasably closing this outer casing at its open end face, a tubular filter element projecting from the cover coaxially to the axis of the outer casing, an elastic, hose-like membrane arranged coaxially between the outer casing and the filter element, this membrane being connected at one edge to the open end face of the outer casing and at the other edge to the free end face of the filter element remote from the cover such that the membrane is inverted when the cover is removed coaxially from the outer casing, also comprising a short suction and pressure connection pipe on the outer casing, a feed pipe for the suspension and an outlet pipe for the filtrate, these pipes being provided on the cover.

A sensitive or susceptible part of known filters of this type (German patent specification DE-PS No. 25 49 040) is the invertable membrane. The efficiency and durability of a filter depend decisively on the design, quality and arrangement of the membrane. It is particularly troublesome when residual suspension remains between filter element and membrane as this makes it more difficult to keep the filter clean. The membrane is subject to substantial pressures which cause it to be pressed against various surfaces of the filter and there is, therefore, a risk of the membrane becoming damaged. It is also important for the membrane to be securely and reliably attached at its edge to prevent any rupturing or tearing during the filtering process. The membrane has one spot which is subject to severe wear and tear. This lies in the vicinity of the feed pipe where the membrane which is subject to pressure endeavours to turn itself inside out into the pipe.

The object underlying the invention is to improve a filter of the type in question such that any wear and tear on the membrane is largely ruled out and the filter therefore has a long service life.

This object is accomplished in accordance with the invention in that the inner diameter of the slack membrane in the region of the filter element is equal to or smaller than the outer diameter of the filter element.

In this way, the membrane does not, when slack, pucker or crease which could lead to cracks forming.

Additional features and advantages of the invention are given in the subclaims.

The following description of a preferred embodiment of the invention serves to explain this invention in greater detail in conjunction with the drawings, in which FIG. 1 shows a filter with invertable membrane in its closed state;

Figure 1:
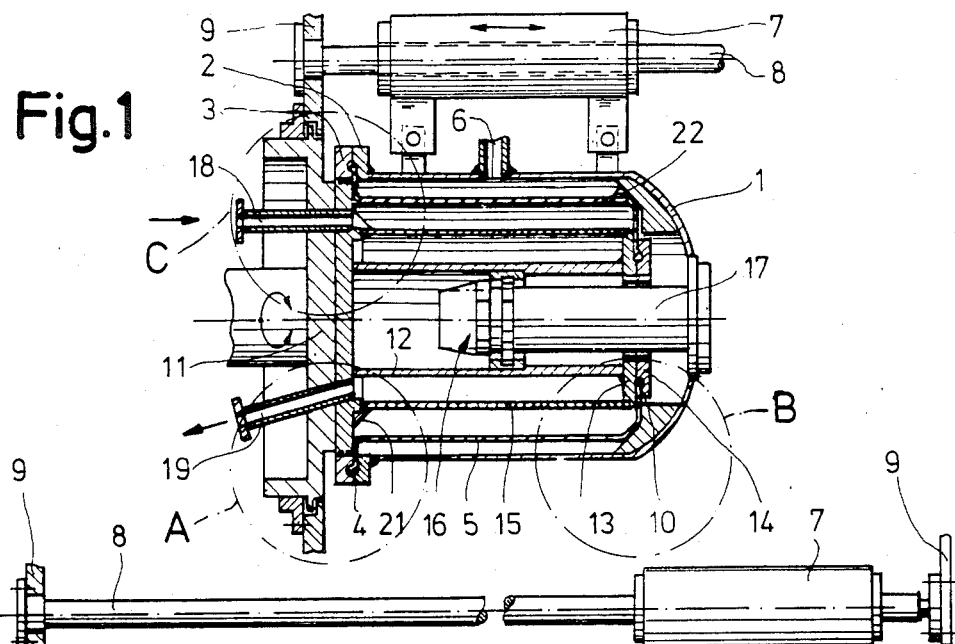

The filter illustrated in the drawings comprises a boiler-shaped outer casing 1 which has a circular cross section, is closed at one end face (to the right in FIGS. 1 and 2) and open at the opposite end face. At its open end face the outer casing 1 bears a circumferential flange consisting of two parts 2, 3, between which one end region 4 of a hose-like membrane 5 is firmly clamped. This membrane is made of an elastically stretchable material. A short suction and pressure connection pipe 6 projects upwardly from the outer casing 1. The outer casing 1 may be connected to a slide 7 via a support structure, the details of which are not of interest here. The slide is displaceable parallel to the axis of the outer casing on a stationary bar 8.

A cover 11 is rigidly or rotatably mounted in a machine frame 9 for tightly closing the open end face of the outer casing 1. A tube 12 projects rigidly from the inner side of the cover 11 facing the outer casing 1. This tube bears at its free end an end flange which is similar to the flange on the opening of the outer casing 1 in that it consists of two parts 13, 14. The other edge 10 of the membrane 5 is firmly clamped between these parts 13, 14.

A tubular filter element 15 having, for example, the shape of a screen drum covered by a filter cloth extends between the inner side of the cover 11 and the flange part 13. The filter element 15 abuts tightly against the inner side of the cover 11 and on the flange part 13.

In the closed state of the filter (FIG. 1) the hose-like membrane 5 extends coaxially between the inner side of the outer casing 1 and the outer side of the filter element 15. In the opened state of the filter (FIG. 2), i.e. when the outer casing 1 and cover 11 are withdrawn from one another in the direction of their common axis, the membrane 5 is inverted or turned inside out in relation to the arrangement of FIG. 1 such that the inner side of the membrane is now its outer side.

Figure 2:
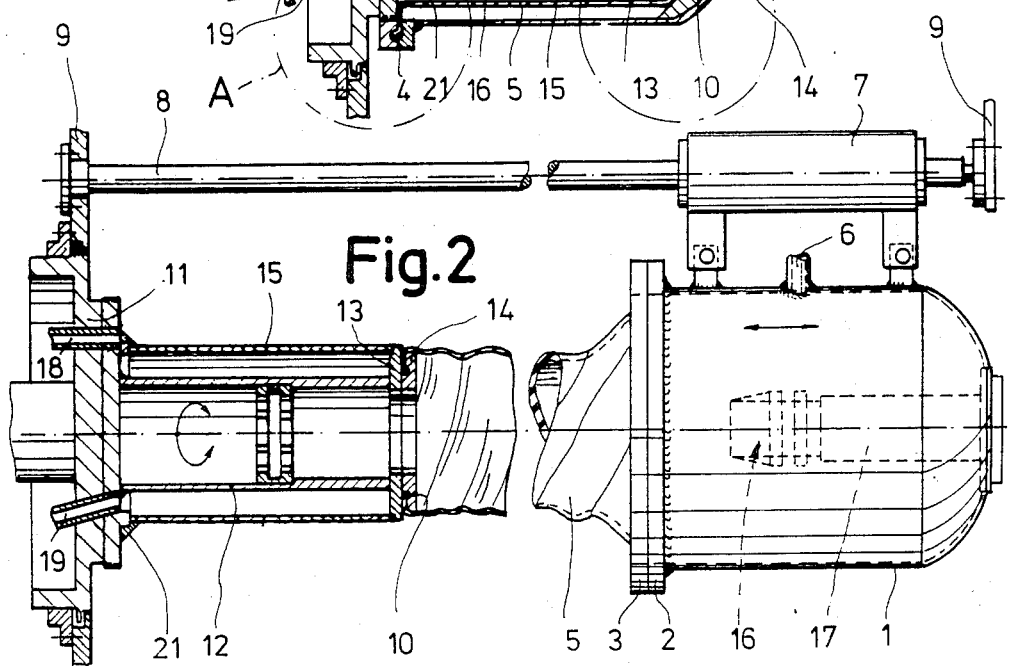
FIG. 2 shows the filter of FIG. 1 in its opened state.

During the filtering process, the filter is closed (FIG. 1). The outer casing 1 is hereby firmly connected to the cover 11 via a bayonet catch means 16 which is located in the interior of the tube 12 and is partially mounted by an arm 17 projecting inwards from the closed end face of the outer casing 1. When an underpressure or vacuum is applied to the connection pipe 6, the membrane 5 assumes approximately the position indicated in in FIG. 1 and so the suspension to be filtered may be introduced via a feed pipe 18 provided on the cover 11. Once feeding has ended the membrane can be pressed against the filter element 15 by applying overpressure to the connection pipe 6 in order to press residual fluid through the filter element. The solid components of the suspension remain on the filter element 15 as filter cake whereas the filtrate pressed through the filter element 15 flows out through an outlet pipe 19 also provided on the cover 11. The filter cake may be removed from the filter element in the opened state of the filter (FIG. 2).

The filter can be cleaned following a filtering operation. For this purpose, the membrane 5 is again lifted off the filter element 15 due to underpressure and can press itself firmly against the inner side of the outer casing 1, which may also occur during feeding of the suspension. After washing, the washing fluid is squeezed out due to the membrane 5 being pressed against the filter element 15 under the influence of overpressure.

It is evident from the above that the membrane is a component of the filter which is subjected to the highest stressing. The operability and service life of this filter depend decisively on the design, quality and arrangement of the membrane 5. It has been established that the durability of the membrane can be improved when, in the region of the longitudinal extension of the filter element 15, the inner diameter of the slack membrane 5, i.e. when it is not subject to either overpressure or underpressure is equal to or smaller than the outer diameter of the filter element. In this way, residual suspension will still be pressed through the filter element when the filter is not in operation and the membrane itself lies flush against the filter element without forming any folds or ripples and so no cracks can form locally.

Figure 3:
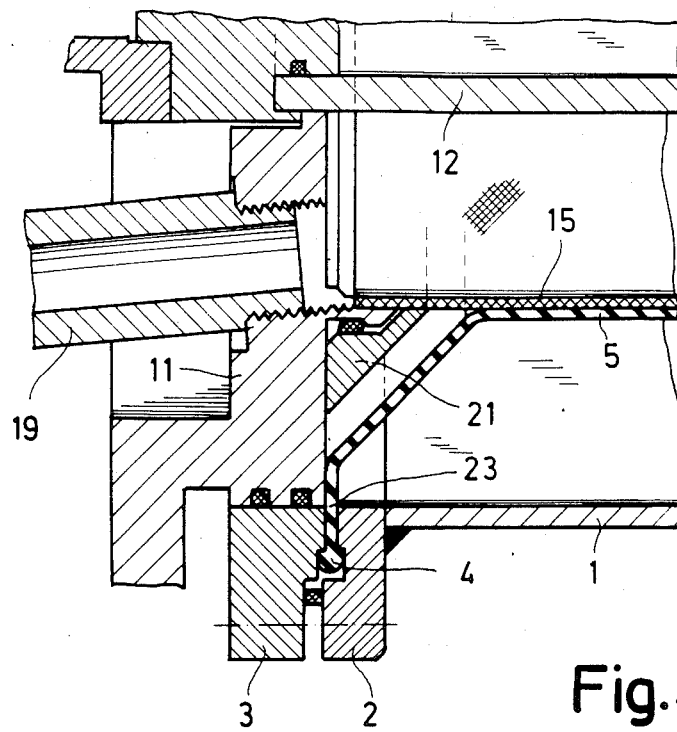
FIG. 3 is a part-sectional view in the area A of FIG. 1.

As shown in the detailed illustration of FIG. 3, an inclined or conical annular shoulder surface 21 projects from and is firmly arranged on the inner side of the cover 11. The edge region of the membrane 5, which is connected to the outer casing 1, is supported on this annular shoulder surface 21 when the membrane is pressed onto the filter element 15 as a result of overpressure. It has been found that without the presence of this annular shoulder surface 21 the membrane is pressed into the right-angled space between filter element 15 and cover 11 when overpressure prevails and is hereby overstretched which can cause damage to the membrane.

As also shown in FIG. 3, the edge region of the membrane 5 which faces the annular shoulder surface 21 is of a conical design. This conical edge region rests flush against the annular shoulder surface 21 when the flexible membrane 5 is subjected to overpressure.

Figure 4:
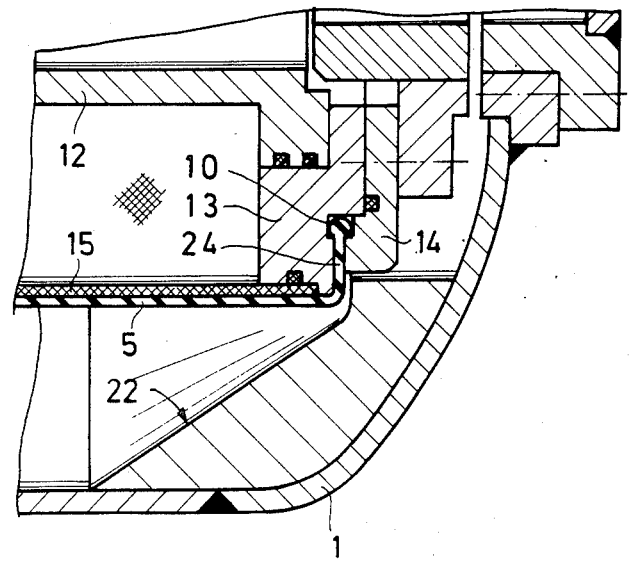
FIG. 4 is a part-sectional view in the area B of FIG. 1.

As shown in FIG. 4, an annular shoulder surface 22 is also provided on the closed inner side of the outer casing 1. This surface is also conical or inclined. In the slack state of the membrane, the edge region of the membrane which is connected with the flange parts 13, 14 of the filter element 15 faces this annular shoulder surface 22. If the outer side of the membrane is subjected to underpressure (via the connection pipe 6) or overpressure (via the outlet pipe 19), it lifts off the filter element 15 and is pressed against the inner side of the outer casing 1. The membrane hereby lies flat against the inclined annular shoulder surface 22. The annular shoulder surfaces 21,22 form with the axis of the filter an angle of between 30° and 60°, preferably about 45°.

FIGS. 3 and 4 show the membrane 5 in its slack state. Since the inner diameter of the membrane 5 is, as already described, equal to or smaller than the outer diameter of the filter element 15, the membrane 5 rests, as illustrated, flush against the outer side of the filter element 15.

As also shown in FIGS. 3 and 4, annular beads are arranged on the edges 4, 10 of the membrane 5 and these are positively clamped between the flange parts 2, 3 or 13, 14, respectively. This means that the membrane 5 cannot be pulled or torn away from the outer casing 1 or the filter element 15 during operation.

The membrane 5 is, moreover, a structural member which is inherently stable in its unstretched state and substantially circular-cylindrical in shape. Circular ring surfaces 23, 24 extending at right angles to the membrane axis are provided at the two edges 4, 10 of the membrane 5 and the conical surface of the membrane which has already been mentioned adjoins the circular ring surface 23.

Figure 5:
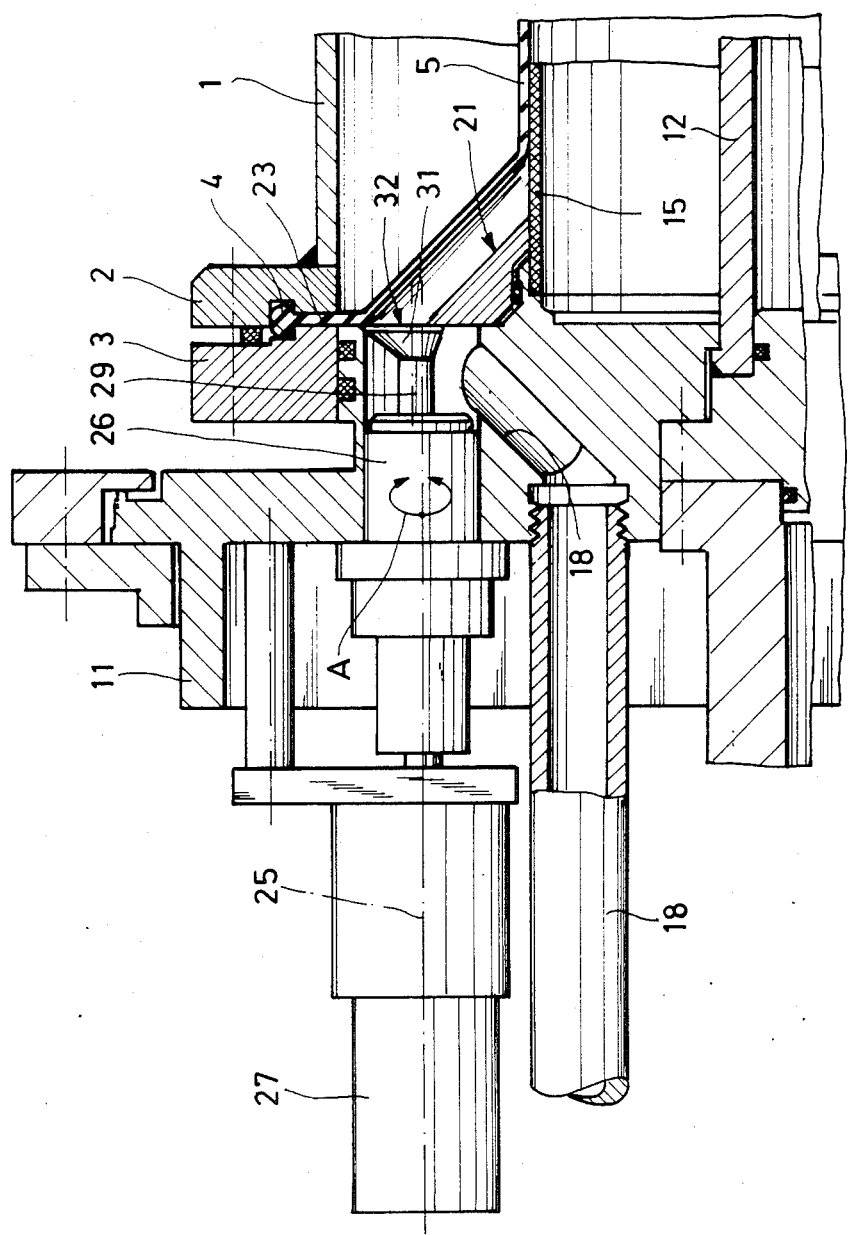
FIG. 5 is a part-sectional view in the area C of FIG. 1.

FIG. 5 shows in detail the feed pipe 18 in the region of the cover 11. A shaft 26 is mounted in the latter for rotation about an axis 25. This shaft may be rotated in the directions of arrow A by a geared motor 27. A journal 29 projects from the end face of the shaft 26. This journal is eccentrically offset in relation to the axis 25 and bears a valve member 31. The journal 29 and the valve member 31 are located in a space, into which the feed pipe 18 opens and which, on the other hand, communicates with the space between membrane 5 and filter element 15 via an opening 32. In the position of the valve member 31 illustrated in FIG. 5 the opening 32 is closed. When the shaft 26 is rotated, the valve member 31 is displaced into the lower region of the aforementioned space. The opening 32 is then open and suspension can flow out of the pipe 18 and into the filter.

As illustrated, the valve member 31 projects right up to the edge of the opening 32 located in the interior of the filter and so the membrane 5 can abut directly on the free end face of the valve member 31. This also avoids corners and edges in the region of the valve member which could cause damage to the membrane 5 subjected to pressure.

A displaceable plunger would also fulfill the purpose of abutting directly on the membrane 5. Such a plunger could, however, push solid matter ahead of it during displacement into its closed position. The membrane might therefore be damaged by this solid matter impinging on it under pressure. Such damage is prevented by the pivotable valve member 31 since it is held so as to be axially non-displaceable and may press solid matter, if at all, into the space located behind it but not against the membrane 5.

I claim:

1. A filter for squeezing out suspensions comprising a boiler-shaped outer casing, having an open end face, a cover releasably closing said outer casing at its open end face, a tubular filter element projecting at one end from said cover coaxially to the axis of the outer casing and having a free end face at the other end, an elastic, hose-like membrane arranged coaxially between the outer casing and the filter element, said membrane having a slack state and being connected at one edge to the open end face of the outer casing and at the other edge to the free end face of the filter element remote from the cover such that the membrane is inverted when the cover is removed coaxially from the outer casing, also comprising a short suction and pressure connection pipe on the outer casing, a feed pipe for the suspension and an outlet pipe for filtrate, these pipes being provided on the cover, and the inner diameter of the membrane (5) in the region of the filter element (15) is smaller than the outer diameter of said filter element and the membrane in its slack state rests flush against the outer side of the filter element.

2. The filter as defined in claim 1, characterized in that an inclined annular shoulder surface (21) is provided on the inner side of the cover (11) for supporting the edge region of the membrane (5) connected to the outer casing (1) when said membrane is pressed onto the filter element (15).

3. The filter as defined in claim 2, characterized in that the edge region of the membrane (5) facing the annular shoulder surface (21) is conically shaped.

4. The filter as defined in claim 2, characterized in that the annular shoulder surface (21) are inclined at an angle of between 30° and 60° to the axis of the filter.

5. The filter, as defined in claim 1, characterized in that an inclined annular shoulder surface (22) is provided on the closed end face of the outer casing (1) for supporting the edge region of the membrane (5) connected to the filter element (15) when the membrane is lifted off the filter element.

6. The filter as defined in claim 5, characterized in that the annular shoulder surface (22) is inclined at an angle of between 30° and 60° to the axis of the filter.

7. The filter as defined in claim 1, characterized in that beads are arranged on the edges (4, 10) of the hose-like membrane (5) to provide a positive connection to the outer casing (1) or the filter element (15), respectively.

8. The filter as defined in claim 1, characterized in that a displaceable valve member (31) is arranged in the feed pipe (18) to support the membrane (5), an end face of said valve member abutting directly on the membrane (5) in its closed state.

9. The filter as defined in claim 8, characterized in that the valve member (31) includes means for pivoting.

* * * * *